United States Patent [19]

Simpson et al.

[11] Patent Number: 5,064,868

[45] Date of Patent: Nov. 12, 1991

[54] SPRAYABLE LIGHTWEIGHT ABLATIVE COATING

[75] Inventors: William G. Simpson, Cocoa Beach, Fla.; Max H. Sharpe; William E. Hill, both of Huntsville, Ala.

[73] Assignee: The United States of America as represented by the Administrator of the National Aeronautics and Space Administration, Washington, D.C.

[21] Appl. No.: 618,854

[22] Filed: Nov. 28, 1990

[51] Int. Cl.$^5$ .................................. C08J 9/236
[52] U.S. Cl. .................................. 521/54; 521/135; 521/136; 521/178; 521/907; 521/84.1; 521/109.1; 523/179; 523/218; 523/219
[58] Field of Search ............... 523/179, 218, 219; 521/54, 135, 136, 178, 907, 84.1, 109.1

[56] References Cited

U.S. PATENT DOCUMENTS

| | | | |
|---|---|---|---|
| 3,457,215 | 7/1969 | Sommer, Jr. | 523/179 |
| 3,755,223 | 8/1973 | Engel | 523/179 |
| 4,031,059 | 6/1977 | Strauss | 523/179 |
| 4,077,921 | 3/1978 | Sharpe et al. | 523/179 |
| 4,772,495 | 9/1988 | Headrick et al. | 523/179 |
| 4,837,250 | 6/1989 | Headrick et al. | 523/179 |
| 4,839,394 | 6/1989 | Champion | 523/179 |

*Primary Examiner*—Morton Foelak
*Attorney, Agent, or Firm*—Robert L. Broad, Jr.; Jerry L. Seemann

[57] ABSTRACT

An improved lightweight, ablative coating that may be spray applied and cured without the development of appreciable shrinkage cracks. The ablative mixture consists essentially of phenolic microballoons, hollow glass spheres, glass fibers, ground cork, a flexibilized resin binder, and an activated colloidal clay.

3 Claims, No Drawings

SPRAYABLE LIGHTWEIGHT ABLATIVE COATING

The invention described in this patent was made by employees of the United States Government and may be manufactured and used by or for the Government for governmental purposes without the payment of any royalties.

BACKGROUND OF THE INVENTION

1. Field of the Invention

This invention relates to insulative coatings. Specifically, the present invention relates to an improved lightweight, ablative composition that may be spray applied.

2. Background Information

This invention is closely related to the low density ablative composition disclosed and claimed in U.S. Pat. No. 4,077,921 ('921). In fact, the present invention is an improvement on the '921 patent. Thus, the '921 patent is expressly incorporated by reference as part of the disclosure for the present invention. As stated in column 5, lines 52-55 of the '921 patent, the '921 material can be applied up to a thickness of 0.5 inch without the need for external reinforcement. However, even though the '921 material can be applied up to a thickness of 0.5 inch, the effectiveness of the '921 material is lessened when the coating thickness exceeds 0.25 inch. This reduced effectiveness is attributed to shrinkage cracks, which form from tensile stresses that develop during curing of the '921 material. The present invention overcomes the problem of stress cracking that occurs in the '921 material when the thickness of the '921 coating exceeds 0.25 inch. By controlling stress cracking, the present invention can provide better insulation to those surfaces requiring an ablative insulation coating in excess of 0.25 inch.

SUMMARY OF THE INVENTION

The present invention provides an improved lightweight, ablative coating that may be spray applied in thicknesses greater than 0.25 inch without having cracks develop from cure stresses in the material. The improvements consist of (1) replacing approximately fifteen percent (15%) of the phenolic microballoons in the '921 material with an equivalent volume of ground cork and (2) substituting a flexibilized epoxy resin binder for the epoxy-modified polyurethane resin binder in the '921 material.

An object of the present invention is to provide a lightweight, ablative coating with improved flexibility.

Another object of the present invention is to provide a lightweight, ablative coating that is less subject to stress cracking during cure.

Still another object of the present invention is to provide a lightweight, ablative coating that can be spray applied and cured in thicknesses greater than 0.25 inch without having appreciable stress cracks develop.

A further object of the present invention is to provide a lightweight, ablative coating that has a stronger char layer during ablation.

A still further object of the present invention is to provide a lightweight, ablative coating with improved thermal properties.

BRIEF DESCRIPTION OF THE DRAWINGS

Drawings are not necessary for understanding the subject matter of this invention.

DESCRIPTION OF THE PREFERRED EMBODIMENT

A preferred embodiment of the present invention consists essentially of (a) about one-hundred (100) parts by weight of an ablative mixture, and (b) two-hundred (200) to four-hundred (400) parts by weight of a solvent. The ablative mixture, in turn, consists essentially of phenolic microspheres, hollow glass spheres, glass fibers, ground cork, a resin binder, and an activated colloidal clay. The components which make up the ablative mixture of the present invention are essentially the same as described in the '921 patent except for two modifications.

The first modification involves the substitution of a flexibilized epoxy resin binder for the epoxy-modified polyurethane resin binder used in the '921 material. Preferably, the flexibilized epoxy resin binder is manufactured by 3M Company as a two-part system known in the trade as EC2216A and EC2216B. However, other resins with similar properties may be available from other sources. The chemical composition of the 3M resin is not known because the composition of the resin is a trade secret belonging to 3M Company.

The second modification involves the substitution of ground cork for a portion of the phenolic microspheres. While the proportion of ground cork to the phenolic microspheres may vary, the best results from a curing standpoint occur when approximately fifteen percent (15%) of the phenolic microspheres are replaced by an equivalent volume of ground cork. As a result of this fifteen percent (15%) substitution, the ablative mixture preferably consists essentially of: (a) twenty-nine (29) to thirty-seven (37) percent by weight of phenolic microspheres; (b) eleven (11) to fifteen (15) percent by weight of hollow glass spheres; (c) four (4) to six (6) percent by weight of glass fibers; (d) two (2) to four (4) percent by weight of ground cork; (e) thirty-eight (38) to forty-eight (48) percent by weight of a flexibilized epoxy resin binder; and (f) two (2) to six (6) percent by weight of an activated colloidal clay.

While each of the two modifications mentioned above improve the performance of the ablative coating alone, the best results with regard to the elimination of stress cracking during cure are obtained when both the changes are made together. The ground cork also improves the thermal conductivity of the ablative coating and the strength of the char layer during ablation.

The fully cured ablative coating has a flatwise tensile strength of 60-80 psi @ 75° F. (0.41-0.55 MPa @ 24° C.), a density of 16-18 lbm/ft$^3$ (256-288 kg/m$^3$), a strain compatibility of 1.4-1.6%, and a thermal conductivity of 0.4 to 0.5 Btu-in/ft$^2$-hr-°F. (5.8-7.2 mW/m-°C.). The cured material also has a low flammability.

What is claimed is:

1. A composition, consisting essentially of:
   approximately one-hundred (100) parts by weight of
   twenty-five (25) to sixty-five (65) percent by weight of phenolic microspheres,
   zero (0) to twenty (20) percent by weight of hollow glass spheres,
   four (4) to ten (10) percent by weight of glass fibers,
   twenty-five (25) to fifty (50) percent by weight of a flexibilized epoxy resin binder, and
   two (2) to six (6) percent by weight of an activated colloidal clay; and two-hundred (200) to four-hundred (400) parts by weight of a solvent.

2. A composition, consisting essentially of:

approximately one-hundred (100) parts by weight of
- twenty (20) to fifty-five (55) percent by weight of phenolic microspheres,
- zero (0) to twenty (20) percent by weight of hollow glass spheres,
- four (4) to ten (10) percent by weight of glass fibers,
- two (2) to four (4) percent by weight of ground cork,
- twenty-five (25) to forty-five (45) percent by weight of a epoxy-modified polyurethane resin binder, and
- two (2) to six (6) percent by weight of an activated colloidal clay;

one (1) to ten (10) parts by weight of an aromatic amine curing agent; and two-hundred (200) to four-hundred (400) parts by weight of a solvent.

3. A composition, consisting essentially of:

approximately one-hundred (100) parts by weight of
- twenty-nine (29) to thirty-seven (37) percent by weight of phenolic microspheres,
- eleven (11) to fifteen (15) percent by weight of hollow glass spheres,
- four (4) to six (6) percent by weight of glass fibers,
- two (2) to four (4) percent by weight of ground cork,
- thirty-eight (38) to forty-eight (48) percent by weight of a flexibilized epoxy resin binder, and
- two (2) to six (6) percent by weight of activated colloidal clay; and two-hundred (200) to four-hundred (400) parts by weight of a solvent.

* * * * *